United States Patent [19]

Toyoda

[11] Patent Number: 5,080,464
[45] Date of Patent: Jan. 14, 1992

[54] OPTICAL NEURAL NETWORK APPARATUS USING PRIMARY PROCESSING

[75] Inventor: Haruyoshi Toyoda, Fukuroi, Japan

[73] Assignee: Hamamatsu Photonics K.K., Japan

[21] Appl. No.: 575,431

[22] Filed: Aug. 30, 1990

[30] Foreign Application Priority Data

Sep. 5, 1989 [JP] Japan .................................. 1-229637

[51] Int. Cl.$^5$ .............................................. G02F 3/00
[52] U.S. Cl. .................................. 359/559; 364/819;
364/822; 365/49; 359/107; 359/561
[58] Field of Search ............ 350/3.82, 162.12, 162.13,
350/3.62, 360, 361; 364/819, 822; 365/49

[56] References Cited

U.S. PATENT DOCUMENTS

| | | | |
|---|---|---|---|
| 4,809,193 | 2/1989 | Jourjine | 350/96.1 |
| 4,833,637 | 5/1989 | Casasent et al. | 364/821 |
| 4,972,348 | 11/1990 | Ishikawa et al. | 365/49 |
| 4,974,202 | 11/1990 | Mukohzaka | 365/49 |

FOREIGN PATENT DOCUMENTS 63-307437 12/1988 Japan .
64-78491 3/1989 Japan .
1-112225 4/1989 Japan .

OTHER PUBLICATIONS

Optical Implementation of the Hopfield Model, N. H. Farhat, D. Psaltis, A. Prata, E. Paek; Applied Optics, May 1985, vol. 24, No. 10.
Optical Associatron: A Simple Model for Optical Associative Memory, M. Ishikawa, N. Mukohzaka, H. Toyoda, Y. Suzuki, Applied Optics, Jan. 1989, vol. 28, No. 2.
Experimental Studies on Adaptive Optical Associative Memory, N. Mukohzaka, H. Toyoda, Y. Suzuki, SPIE, vol. 963, pp. 527-536 (1988).

Primary Examiner—Bruce Y. Arnold
Assistant Examiner—Martin Lerner
Attorney, Agent, or Firm—Oliff & Berridge

[57] ABSTRACT

For inputting a two-dimensional image into an optical neural network apparatus, a primary processing device is used to extract the characteristic feature of an object pattern. Thereafter, compressed information as a result of the above processing is inputted into the input of the all-optical type optical neural network apparatus, that implements parallel processings adaptively through optical computing, at individual points on the input of the same. Therefore, the primary processing device that was capable of dealing with only logical input information until now can process even vague input information by the use of the optical neural network apparatus located on the later stage. On the other hand, the use of the primary processing device on the previous stage of the optical neural network apparatus enables a limited input range of the optical neural network apparatus to be expanded together with the assurance of higher degree processing by inputting into the optical neural network apparatus results of the characteristic feature extraction from an original image.

12 Claims, 4 Drawing Sheets

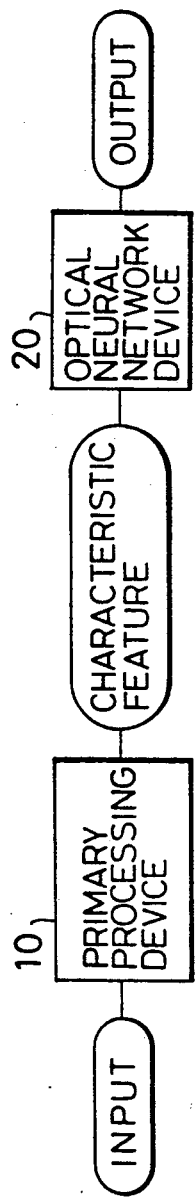
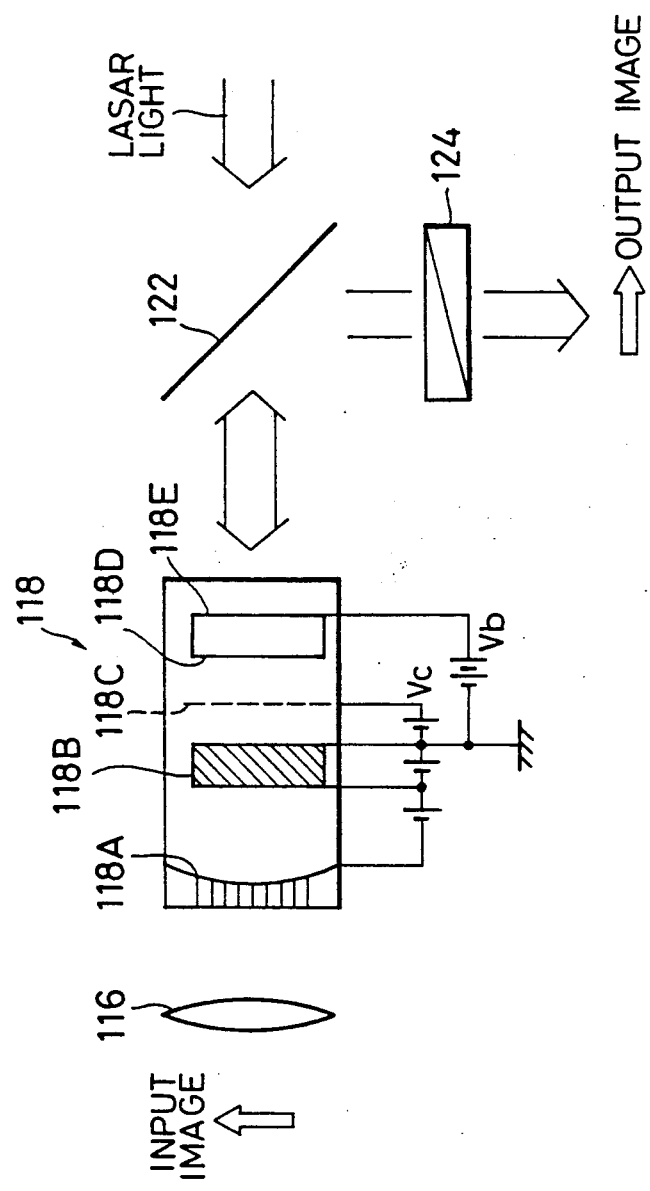

α = 0.1

α = 0.3

α = 0.5

OPTICAL NEURAL NETWORK APPARATUS USING PRIMARY PROCESSING

BACKGROUND OF THE INVENTION

1. Field of the Invention

The present invention relates to an optical neural network apparatus using a primary processing, and more specifically to an optical neural network apparatus capable of expanding a limited input range by extracting the characteristic feature of input information using the primary processing for an input of the optical neural network apparatus and of easily dealing with also a mutual recall type associative memory system using a different input/output relation.

2. Description of the Prior Art

There have recently been accumulated earnest studies to realize a new processing architecture on the basis upon a neural network model that is a model of an information processing system in a human brain, the new processing architecture being different from a conventional Von Neumann type computer architecture. The neural network model is a large-scale parallel computing one assuming a neuron model as a basic unit, and exhibits, as a characteristic feature, an information processing function that is self-organizable autonomously.

In order to essentially realize the architecture of the neural network, it is therefore necessary to achieve complete parallel processing with respect to all processing mechanisms such as a computing mechanism, networks, and input and output units.

To realize such complete parallel processing, optical computing and optical connection have attracted attention which utilize as an information medium light demonstrating higher spatial parallel properties in principle. According to the technique which utilizes light, large-scale parallel computing and high density parallel connection are achievable. Much interest is therefore put on this method as being an effective hardware to realize the large-scale parallel computing capability of the neural network model.

As associative memory model, in particular, in the neural network model exhibits a uniformly parallel computing architecture so that there is a possibility of realizing a high density computing and interconnecting capability utilizing the advantages of the optical computing.

The inventors have proposed an optical associative memory system incorporating a learning function called an optical associatron, in the Japanese Society of the Electronic Information Communication held 1988, July 7 and in Japanese Patent Laid-Open Publications No. 64-78491, and No. 63-307437, etc. The optical associatron has achieved highly adaptive associative memory through optical computing by utilizing the analog parallel computing and memory function of a microchannel spatial light modulator tube and introducing an orthogonal learning method. Additionally, there have been reported, instead of such an optical associatron, many trials to realize the associative memory system using the large-scale parallel properties of light (for example as disclosed in Japanese Patent Laid-Open Publication No. 1-112225).

Herein, the associative memory system means a kind of content addressable memory system in which many patterns are stored in a memory device in overlapping and only part of a necessary pattern is fed to a computing device, so that only the necessary pattern is separated and fetched from the memory device. Use of such an associative memory system enables associative processing through a vague input, that is inadvantageous for prior computers, to be realized and computing time to be sharply reduced.

The prior optical associative memory system, however, suffers from a difficulty that input cells are limited to a small number, say, $4 \times 4 = 16$ in the foregoing optical associatron without permitting a two-dimensional (2-D) image to be inputted intactly, and hence an allowable input range is limited. Additionally, the prior optical associatron incorporates an auto associative memory system using the same member for an input/output relationship and hence fails in learning and association with a wide input/output relationship.

In contrast, there is widely known a technique to subject input information to the primary processing. For example, with image data taken as the input information, edge extraction, thinning, magnification, compression, rotation, and the like are performed as the primary processing. Additionally, primary processing with use of an optical system is also performed in which a two-dimensional coherent image is transmitted by a lens, whereby an optical Fourier transformation image of an original image can be formed on a focal surface in real time. Accordingly, application of the primary processing to optical computing was intended up to now. However, the optical computing (Fourier transformation, for example), although it enjoys a high speed owing to its high parallel property, suffers from a difficulty in matching with a next stage computer, that has only a logical processing capability as the feature, provided an optical system exhibits low accuracy or an image subjected to the primary processing includes any vague property, with a result that it is difficult in handling and hence it presents little availability.

SUMMARY OF THE INVENTION

In view of the drawbacks with the prior art, it is an object of the present invention to provide an optical neural network apparatus in which the primary processing that can process only logical information until now can process even vague input information through the use of an optical neural network apparatus, while the primary processing is applied to the input of the optical neural network apparatus to expand the limited input range for assurance of higher degree processing.

To achieve the above object, an optical neural network apparatus according to the present invention comprises, as illustrated in FIG. 1, a primary processing device 10 for subjecting two-dimensional image input information to a primary processing to extract the characteristic feature of an object pattern, and an optical neural network device 20 for parallely processing the compressed information adaptively through optical computing.

For the foregoing primary processing device 10, there is employed an optical Fourier transformation device composed of an image conversion device for converting a two-dimensional input image to a coherent image, a two-dimensional Fourier transformation optical device for subjecting said coherent image to optical Fourier transformation, and a characteristic feature quantity memory device for storing therein said Fourier image. Additionally, for the foregoing optical neural network device 20, there is employed an optical associative memory device composed of a multiply imaging system for multiply imaging the Fourier image read from said characteristic feature memory device; an input pattern conversion device for holding said image multiply imaged as such; a memory matrix holding device for holding a memory matrix corresponding to a cross correlation between the input pattern and an associative output pattern; a locally imaging system for locally imaging an image formed by sequentially reading out the images each held by said input pattern conversion device and said memory matrix holding device and implementing partial sum computation through optical computing; an output function computation device for applying an output function to the image so locally image through optical computing to provide an associative output; magnifying/imaging system for magnifying and imaging a learning output pattern or the associative output pattern for the input pattern to be stored; and a learning computation device for learning said memory matrix through optical computing with use of said image magnified and imaged and the image multiply imaged by said input pattern conversion device.

In accordance with the present invention, a two-dimensional image is not inputted intactly into the optical neural network apparatus 20, but the characteristic feature of an object pattern is extracted by the primary processing device 10 and thereafter compressed information as a result of the extraction is inputted into the all-optical neural network apparatus 20 at individual points on the input of the same to process parallely adaptively through the optical computing. Therefore, the primary processing device 10, that was capable of processing only logical input information until now, is capable of processing even vague input information by incorporating the optical neural network device 20 on a latter stage. On the other hand, the primary processing device 10 is used at a previous stage of the optical neural network device 20 and hence an extraction result of a characteristic feature from an original image is inputted at individual points on the input of the optical neural network device 20. Hereby, a limited input range of the optical neural network device 20 can be expanded to implement high degree processing. Further, the amount of computation can be reduced for effective processing and the best use can be made of the parallel property of light, together with the assurance of high speed flexible computation and hence a countermeasure to hetero associative memory. Still more, use of the all-optical neural network apparatus 20 enables any information to be transmitted as a light signal to the latter stage optical associative memory device when in particular optical computing is incorporated as the primary processing. Furthermore, any input information is rendered to optical computing parallely and hence a processing speed is not slowed down whatever the number of inputs is. Additionally, even in cases where input information involves ambiguity or it is difficult to logically describe relationships among input informations, a relationship between an input and an output can be processed by learning. It is thus made possible to sharply shorten the time required for learning and associative recalling.

BRIEF DESCRIPTION OF THE DRAWINGS

The preferred embodiments will be described with reference to the drawings, wherein like elements have been denoted throughout the figures with like reference numerals, and wherein:

FIG. 1 is a block diagram illustrating the basic construction of the present invention;

FIG. 3 is a sectional view illustrating the basic construction of a microchannel spatial light modulator tube used in the embodiment of FIG. 2;

DESCRIPTION OF THE PREFERRED EMBODIMENTS

In what follows, embodiment of the present invention will be described with reference to the accompanying drawings.

Figure 2:
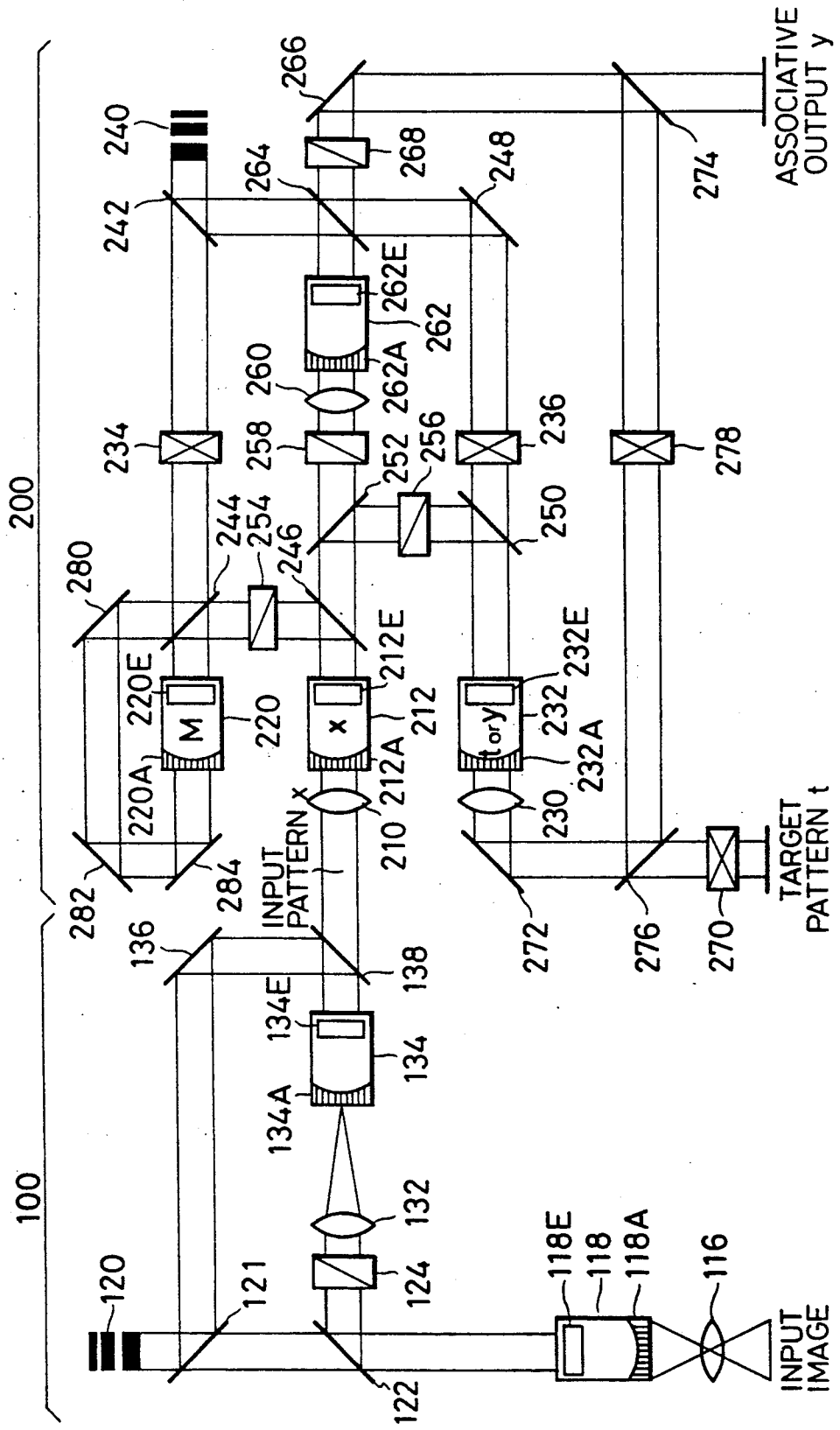
FIG. 2 is a view of an optical path illustrating the construction of an embodiment of the present invention.

The embodiment comprises, as illustrated in FIG. 2, an optical Fourier transformation device 100 as the foregoing primary processing device, and an optical associative memory device 200 as the foregoing neural network device.

The optical Fourier transformation device 100 comprises a lens 116 for imaging a two-dimensional input image on a photo cathode 118A of microchannel spatial light modulator tube 118 described later, the microchannel spatial light modulator tube 118 as the image conversion device for forming an electric charge image of the incoherent input image on an electrooptic crystal (or liquid crystal cell) 118E, and converting the electric charge image to a coherent image corresponding to an electric charge distribution of the electric charge image by irradiating the electrooptic crystal 118E with laser light form a laser light source (helium-neon laser, for example) through half mirrors 121, 122 and thereafter passing reflected light from the electrooptic crystal 118E through an analyzer (polarizing plate) 124, a Fourier transformation (FT) lens 132 for implementing optical Fourier transformation by focusing the coherent image to obtain a Fourier image on a focal surface, a microchannel spatial light modulator tube 134 as the characteristic feature quantity memory and processing device for forming a characteristic feature extraction pattern converted into a spatial frequency region through the FT lens 132 on a photo cathode 134A and storing the characteristic feature extraction pattern formed as such on an electrooptic crystal (or liquid crystal cell) 134E, and the half mirror 121, and mirror 136 and half mirror 138 for irradiating the electrooptic crystal 134E of the microchannel spatial light modulator tube 134 with the laser light from the laser light source 120 when the stored image is read out.

The optical associative memory device 200 comprises a multiply imaging system 210 formed of a multilens array or of a diffraction grating for example for forming a multiple image of the characteristic feature image read from the microchannel spatial light modulator tube 134 of the optical Fourier conversion device 100, a microchannel spatial light modulator tube 212 as the input pattern conversion device for storing the multiple image formed on the photo cathode 212A by the multiply imaging system 210 on the electrooptic crystal 212E as an electric charge image, a spatial light modulator tube 220 as the memory matrix holding device for holding a memory matrix M corresponding to a cross correlation between an input pattern X and an associative output pattern y on an electrooptic crystal 220E as an electric charge image, a magnifying/imaging system 230 for magnifying and imaging a learning output pattern (called a training pattern) t or an associative output pattern y with respect to an input pattern desired to be stored, a microchannel spatial light modulator tube 232 as the learning computation device for holding a magnified image formed on a photo cathode 232A by the magnifying/imaging system 230 on an electrooptic crystal 232E as an electric charge image and learning the memory matrix M using the magnified image through optical computing, a laser light source 240, half mirrors 242, 244, 246, 248, 250, 252, and analyzers 254, 256, 258 all for implementing together optical computing of a Hadamard product between the memory matrix held by the microchannel spatial light modulator tube 220 and the multiple input image held by the microchannel spatial light modulator tube 212 and between the magnified image held by the microchannel spatial light modulator tube 232 and the multiple input image held by the microchannel spatial light modulator tube 212 by successively reading the microchannel spatial modulator tubes 220 and 212 and the microchannel spatial modulator tubes 232 and 212 by switching shutters 234 and 236, utilizing a fact that the corresponding two elements parallely undergo intensity modulation, a locally imaging system 260 composed for example of a multilens array or a diffraction grating for locally imaging the result of the optical computing, a microchannel spatial light modulator tube 262 as the output function computation device for implementing output computation by applying an output function to the image formed by the locally imaging system 260, a half mirror 264, a mirror 266 and an analyzer 268 for reading an electric charge image formed on an electrooptic crystal 262E of the microchannel spatial light modulator tube 262 by the laser light source 240 to provide the associative output y, a shutter 270 and a mirror 272 for inputting the training pattern t onto the microchannel spatial light modulator tube 232 at need, half mirrors 274, 276 and a shutter 278 for inputting the associative output y onto the microchannel spatial light modulator tube 232 at need, and mirrors 280, 282 and 284 for writing the memory matrix onto the microchannel spatial light modulator tube 220.

The shutters 234, 236, 270 and 278 of the optical associative memory device 200 are controlled by a control computer (not shown). Herein, the shutters 234, 236 switch the modes of a learning process and an association process, and the shutters 270, 278 are to switch the inputting of a target pattern and a middle recall pattern in the learning process.

The microchannel spatial light modulator tubes 118, 134, 212, 220, 232 and 262 comprise, as illustrated in FIG. 3 for example, a photo cathode 118A for converting to a photo image an incident input image through a lens (116 for example), a microchannel plate (MCP) 118B for multiplying the photoelectric image emitted from the photo cathode 118A, a mesh electrode 118C for accelerating photoelectrons multiplied by the MCP 118B, and the electrooptic crystal 118E for permitting an electric charge pattern to be formed on an electric charge storage surface 118D on the left side in the figure by electrons transmitted through the mesh electrode 118C.

In the microchannel spatial light modulator tube (118 for example), an electric charge pattern is formed on the electric charge storage surface 118D of the electrooptic crystal 118E corresponding to an input image, and an electric field across the electrooptic crystal 118E is changed responsibly to the electric charge pattern to change the refractive index of the crystal 118E by Pockels effect. Accordingly, irradiated the electrooptic crystal 118E with linearly polarized laser light from the right side in the figure, reflected light from the electric charge storage surface 118D which has been changed in its polarization state owing to the birefringence of the electrooptic crystal 118E, provides an output image having light intensity corresponding to that of the input image after it passes through an analyzer (124 for example).

The microchannel spatial light modulator tube exhibits, besides an incoherent light to coherent light conversion function and an analog memory function, excellent functions such as an addition/subtraction function, a real time thresholding function, an AND computation function, and so on, those functions being realizable by controlling electric charges under proper conditions. An optical associative memory device utilizing those functions is disclosed in Japanese Patent Laid-Open Publications Nos. 63-307437 and 64-78491, etc.

In the following, operation of the embodiment will be described.

At first, operation of the optical Fourier transformation device 100 will be described.

A two-dimensional image as an input image is inputted into the microchannel spatial light modulator tube 118 as the image conversion device for converting the input image to a coherent one, and stored in the same tube 118 as the electric charge image. The electric charge image stored in the microchannel spatial light modulator tube 118 is irradiated with laser light from a read side (upper side in the figure) to form a coherent image corresponding to an electric charge distribution. The resulting coherent image is focused through the FT lens 132 to form a Fourier image on a focal surface of the FT lens 132. The pattern converted into a spatial frequency region by the optical Fourier transformation is stored in the microchannel spatial optical modulator tube 134 as the characteristic feature quantity memory device in the form of an analog characteristic feature quantity. Herein, a further simple primary processing may also be implemented by thresholding, integration, differentiation, and the like, utilizing the computation functions possessed by the microchannel spatial light modulator tube 134. The results are supplied to the next stage optical associative memory device 200.

In succession, operation of the optical associative memory device 200 will be described.

The memory function, the subtraction function, and basic computations in the magnifying/imaging system, the multiply imaging system, the locally imaging system (inverse multiply imaging system), and the like in the optical associative memory device 200 have been described in detail in the foregoing Japanese Patent Laid-Open Publication No. 63-307437 and the like, and the description thereof is here omitted.

The optical associative memory device 200 is to realize a hetero associative memory device in all-optical system for analog input data.

The principle of the hetero associative memory will first be described. A cross correlation matrix is used to realize the associative memory in which a memory matrix M is formed on the basis of a cross correlation between a pair of patterns to be stored (an input pattern X desired to be learned and a learning output pattern t with respect to the former). With successive computation, the operation in learning is as follows:

$$M(n+1) = M(n) + \alpha(t - \phi(M(n) \times x))x^T \quad (1)$$

where x denotes a learning input pattern to be stored, t learning output pattern corresponding to the learning input pattern (target pattern), M a memory matrix, $\alpha$ a learning gain, $\phi$ an output function, and T a transposed matrix.

The memory matrix M (n+1) is yielded by modifying the memory matrix M by multiplying by the learning matrix $\alpha$ a correlation between an error fraction indicated by a difference between $\phi(M(n) \cdot x)$ as a result recalled by the nth matrix Mn and the learning output pattern t, and the input pattern x. Thus, repeated operation of the equation (1) provides the correlation matrix M with separation capability. Therefore, even a pattern involving any noise more or less permits recall of a stored pattern by constructing the memory matrix M based upon a cross correlation between a pair of patterns to be stored, and taking, in recalling, a correlation between the just-mentioned noisy pattern and the memory matrix M.

Operation of the optical associative memory device 200 comprises learning and recall operation which are as follows, respectively.

1. Recall Operation

The recall operation is given by:

$$y = \phi(M(n) \cdot xmlt)loc \quad (2)$$

where xmlt denotes a multiple image of the input pattern x and loc a local imaging.

In the recall process, the input x sent from the previous stage optical Fourier transformation device 100 is first converted by the multiply imaging system 210, and the multiple image xmlt is written in the spatial light modulator tube 212 serving to convert an input pattern. The memory matrix M has been held by the microchannel spatial light modulator tube 220. Accordingly, the products (Hadamart product) at respective points on the microchannel spatial light modulator tubes 220, 212 are parallely computed by opening and closing the shutters 234, 236, respectively, and successively irradiating the microchannel spatial light modulator tubes 220, 212 with laser light emitted from the laser light source 240 to read the images held by the microchannel spatial light modulator tubes 220, 212. Namely, optical computing of M·xmlt is implemented for each pair of points on the spatial light modulator tubes.

The result of the optical computing is locally imaged (loc) through the locally imaging system 260 for the partial sum computation. In succession, the output function $\phi$ is applied to the result of the computation by the microchannel spatial light modulator tube 262 for the output computation to provide the associative output y. Herein, the output function $\phi$ may include thresholding computation and sin² computation.

2. Learning Operation

Learning here means formation of the memory matrix M. The learning operation is realized as follows:

$$M(n+1) = M(n) + \alpha(tmag \cdot xmlt) - \alpha(ymag \cdot xmlt) \quad (3)$$

In an initial state, the microchannel spatial light modulator 220 for the memory matrix is at a state where nothing is stored therein, namely satisfies M(0)=0.

Accordingly, with the shutters 278 and 270 closed and opened, respectively, the learning output pattern t corresponding to the input pattern x to be stored is magnified and imaged by the magnifying/imaging system 230 into the magnified image tmag which is in turn written in the microchannel spatial light modulator tube 232 for the learning computation. In contrast, the multiple image xmlt of the input pattern x is written in the microchannel spatial light modulator tube 212 for the input pattern conversion in the same manner as in the recall operation. In this state, with the shutter 234 closed and the shutter 236 opened, the microchannel spatial light modulator tubes 232, 212 are successively irradiated with the laser light from the laser light source 240 to successively read the images stored in the those tubes. Hereby, the Hadamard product (tmag·xmlt) between the magnified teaching pattern tmag and the multiple image xmlt of the input pattern is computed and added to the memory matrix microchannel spatial light modulator tube 220. In succession, with the shutter 270 closed and the shutter 278 opened, the associative result y stored in the output function microchannel spatial light modulator tube 262 is written in the microchannel spatial light modulator tube 232 in the form of ymag through the magnifying/imaging system 230. Further, the microchannel spatial light modulator tubes 232, 212 are successively read to compute the Hadamard product ymag·xmlt which is in turn substracted from the memory matrix microchannel spatial light modulator tube 220. At this time, the learning gain $\alpha$ can be operated by write time control into the microchannel spatial light modulator tube 220 or voltage control.

With the above operation repeated, the learning is advanced and the associative capability of the memory matrix M is increased.

Use of the memory matrix M so learned (two-dimensional analog value is held) enables processing functions such as pattern recognition and classification.

In the present embodiment, displays of the input pattern and learning output pattern, and the memory matrix indicative of the weight between the input and the output are the basic operations, and the operation between the input and the memory matrix that is highly parallel operation is implemented by the optical computing.

Now, here will be considered hetero associative memory in which a proper symbol is associated with information from a certain object, e.g., an "apple" is recalled from a word "red". To realize such memory device with the aid of the associative memory device using optical computing as in the above embodiment, a difficulty is experienced: if the memory matrix M is saturated from reasons that expression of a negative quantity is difficult because the operation uses light intensity and an upper limit is existent because transmittancy is used, associative capability is lowered and learning does not converge. In such a situation, it is possible to devise the setting of the learning output pattern and the setting voltages of the microchannel spatial light modulator tubes.

More specifically, for setting the learning output pattern t, when the output pattern t is set with respect to the input learning pattern x formed of a plurality of signals (signals from varieties of sensors in an object recognition system, for example), the saturation of the memory matrix M can be reduced by setting the mean value of the learning output patterns t such that it is equal to the mean value of dynamic range of the memory matrix M.

Additionally, the saturation of the memory matrix can also be reduced by bringing the initial value M (O) of the memory matrix upon starting the learning to the center of the dynamic range of the memory matrix M.

Figure 4A:
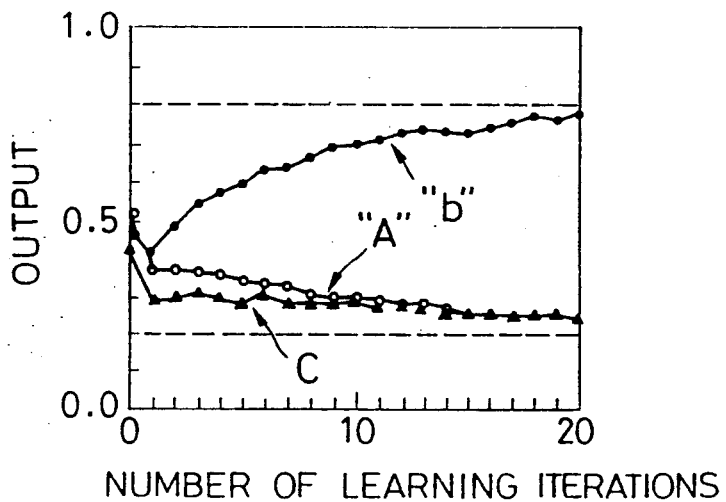
FIGS. 4(A), 4(B) and 4(C) are diagrams illustrating different convergence states due to different learning gains $\alpha$ in the embodiment of FIG. 2.
Figure 4B:
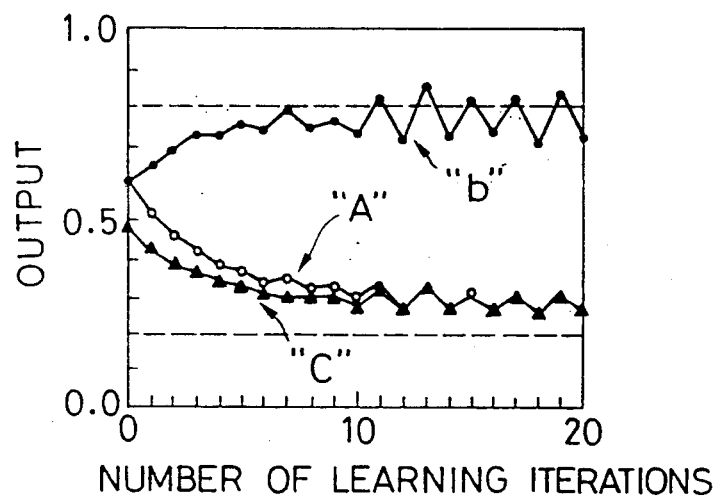
Figure 4C:
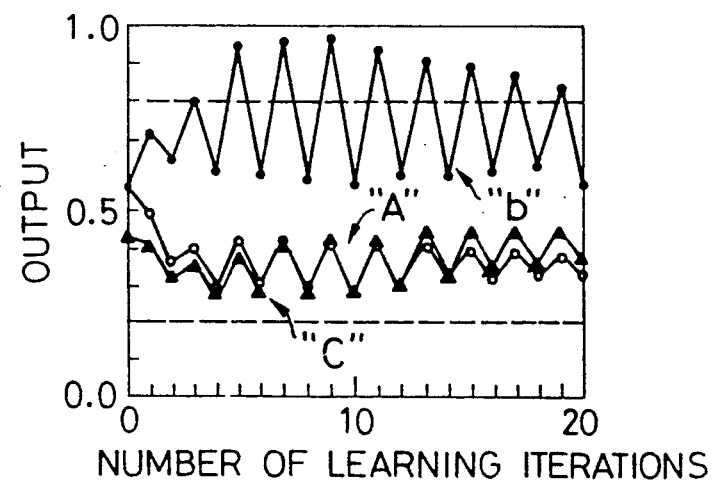
Figure 5:
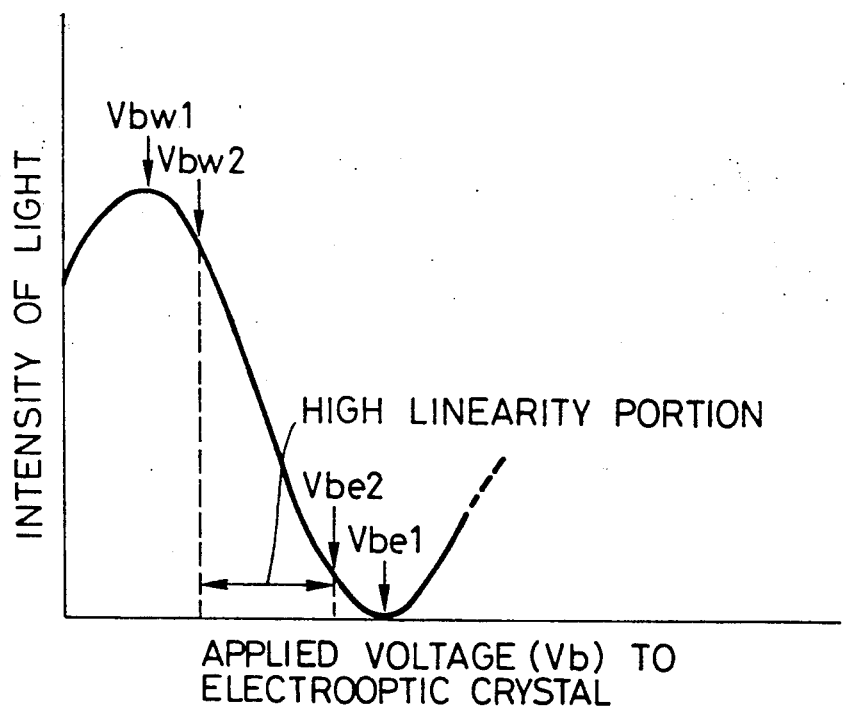
FIG. 5 is a diagram illustrating an example of voltage setting in the microchannel spatial light modulator tube, where linearity is regarded as being important, in a modified example of the embodiment of FIG. 2.

Moreover, in the learning operation, a convergence speed of the learning and saturation timing of the memory matrix are greatly varied, as illustrated in FIGS. 4(A), 4(B) and 4(C) for example, depending upon the set value of the learning gain $\alpha$. Namely with $\alpha=0.1$, stable learning is realized although the convergence is slow. With $\alpha=0.3$, the convergence is fast and separation upon recalling is satisfactory. With $\alpha=0.5$, stability is unsatisfactory. Therefore, to avoid the saturation of the memory matrix M, a learning gain may be selected with which the memory matrix converges without any oscillation.

Further, the foregoing microchannel spatial light modulator tubes have a $sin^2$ relation with respect to input-output function characteristics. In the learning, however, higher linearity is advantageous because it has less distortion upon the convergence. In this respect, operating voltages (application voltage Vb to the electrooptic crystals 212E, 220E) of the input pattern display microchannel spatial light modulator tube 212 and the memory matrix microchannel spatial light modulator tube 220 may be altered from a combination of ordinary set voltage Vbw1 and Vbe1 to that of Vbw2 and Vbe2 to assure good linearity input/output characteristics.

In the present embodiment, there were employed the optical Fourier transformation device 100 as the primary processing device and the optical associative memory device 200 as the optical neural network apparatus, with all processings implemented through optical computing, thereby assuring high speed operation. Herein, the combination of the primary processing device and the optical neural network apparatus is not limited to the above embodiment. For example, for the primary processing there are known versatile information compression technology such as two-dimensional image characteristic feature extraction processing such as those of edge extraction, thinning, rotation, magnification, reduction and balancing etc.; sensor output processing; correlation output processing, and so on, compressed information by one or some of those technology may be sent to the next stage optical neural network apparatus for recognition processing. For example, the two-dimensional image characteristic feature extraction processing allows application of optical computing thereto by the use of computational capabilities possessed by the microchannel spatial light modulator tubes and of an electronic lens system. On the other hand, for the sensor output processing and the correlation output processing, an output from the primary processing side may be converted to an optical signal as an input to the later stage optical neural network apparatus.

Furthermore, although in the above embodiment the optical hetero associative memory device was employed as the optical neural network apparatus, the optical neural network apparatus is not limited thereto. For example, there may also be available other associative memory devices such as a multilayered type associative memory device utilizing back-propagation and so on, a two-way associative memory device, a Hopfield type associative memory device, and the like, and further a general optical neural network apparatus.

In the above system, microchannel spatial light modulator tubes are used as optical device. However, other optical device such as PROM device, liquid crystal type optical device can be used.

Further, multiple imaging and/or local imaging can be realized by cylindrical lens and/or grating by modifying coding.

What is claimed is:

1. An optical neural network apparatus using a primary processing, comprising:
    (a) a primary processing device for subjecting two-dimensional image input information to primary processing to extract the characteristic feature of an object pattern; and
    (b) an optical neural network device for parallely processing compressed information adaptively with optical computing;
    wherein said optical neural network device is an optical associative memory device which includes:
    a multiply imaging system for multiply imaging a characteristic feature extraction image read from said primary processing device;
    an input pattern conversion device for holding an image thus multiply imaged;
    a memory matrix holding device for holding a memory matrix in response to a cross correlation between an input pattern and an associative output pattern;
    a locally imaging system for locally imaging an image formed by sequentially reading images held by said input pattern conversions device and said memory matrix holding device to implement partial sum computation through optical computing;
    an output function computation device for applying an output function to an image thus locally imaged through the optical computing and obtaining an associative output;
    a magnifying/imaging system for magnifying and imaging a learning output pattern or an associative output pattern for an input pattern to be stored; and
    a learning/computation device for learning said memory matrix through optical computing with use of an image thus magnified and imaged and the image multiply imaged by said input pattern conversion device.

2. An optical neural network apparatus according to claim 1 wherein said primary processing device implements said primary processing through optical computing.

3. An optical neural network apparatus according to claim 2 wherein said primary processing device is an optical Fourier transformation device which includes
    an image conversion device for converting a two-dimensional input image to a coherent image,
    a two-dimensional Fourier transformation optical device for subjecting said coherent image to optical Fourier transformation, and
    a characteristic feature quantity memory device for storing said Fourier image.

4. An optical neural network apparatus according to claim 3 wherein said image conversion device includes
    a lens for imaging an incoherent two-dimensional input image, and a microchannel spatial light modulator tube for forming an electric charge image of the input image formed on an input side photo cathode through said lens on an output side electrooptic crystal, and converting said input image to a coherent image corresponding to an electrical distribution of the electric charge image through an optical analyzer when irradiated said electrooptic crystal with laser light.

5. An optical neural network apparatus according to claim 3 wherein said two-dimensional Fourier transformation optical device comprises a Fourier transformation lens for implementing optical Fourier transformation by focusing said coherent image to form a Fourier image on a focal surface.

6. An optical neural network apparatus according to claim 3 wherein said characteristic feature quantity memory device includes a microchannel spatial light modulator tube for forming a characteristic feature extraction pattern converted into a spatial frequency region by said two-dimensional Fourier transformation optical device on the input side photo cathode and storing said pattern on the output side electrooptic crystal as an electric charge image.

7. An optical neural network apparatus according to claim 1 wherein at least one of said multiply imaging system and the locally imaging system comprises a multilens array.

8. An optical neural network apparatus according to claim 1 wherein said input pattern conversion device includes a microchannel spatial light modulator tube for storing a multiple image formed on the input side photo cathode by said multiply imaging system on the output side electrooptic crystal as an electric charge image.

9. An optical neural network apparatus according to claim 1 wherein said memory matrix holding device includes a microchannel spatial light modulator tube for holding said memory matrix on the electrooptic crystal as an electric charge image.

10. An optical neural network apparatus according to claim 1 wherein said learning/computation device includes a microchannel spatial modulator tube for holding a magnified image formed on the input side photo cathode by said magnifying/imaging system on the output side electrooptic crystal as an electric charge image, and learning said memory matrix using said multiplied image.

11. An optical neural network apparatus according to claim 1 wherein said output function computation device includes a microchannel spatial light modulator tube.

12. An optical neural network apparatus according to claim 1 further comprising a laser light source, half mirrors for splitting laser light, shutters for switching operating modes and input patterns by blocking the laser light at need, and analyzers.

* * * * *